(12) United States Patent
Sharpe et al.

(10) Patent No.: US 12,360,034 B2
(45) Date of Patent: *Jul. 15, 2025

(54) METHOD AND APPARATUS FOR AN ANTI-SORTING FLOW CYTOMETER

(71) Applicant: CYTONOME/ST, LLC, Bedford, MA (US)

(72) Inventors: Johnathan Charles Sharpe, Hamilton (NZ); Kiryakos S. Mutafopulos, Somerville, MA (US)

(73) Assignee: CYTONOME/ST, LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/414,008

(22) Filed: Jan. 16, 2024

(65) Prior Publication Data
US 2024/0151628 A1    May 9, 2024

Related U.S. Application Data

(63) Continuation of application No. 17/723,236, filed on Apr. 18, 2022, now Pat. No. 11,921,026.
(Continued)

(51) Int. Cl.
G01N 15/10    (2024.01)

(52) U.S. Cl.
CPC ..... *G01N 15/10* (2013.01); *G01N 2015/1006* (2013.01); *G01N 2015/1028* (2024.01)

(58) Field of Classification Search
CPC .............. G01N 15/10; G01N 15/1459; G01N 2015/1006; G01N 2015/1493;
(Continued)

(56) References Cited

U.S. PATENT DOCUMENTS 7,569,788 B2    8/2009    Deshpande et al.
10,670,508 B2 *  6/2020    de Wagenaar ..... G01N 15/1031
(Continued)

FOREIGN PATENT DOCUMENTS

CN    106536709 A    3/2017
DE    102015218177 A1    3/2017
(Continued)

*Primary Examiner* — Gene O Crawford
*Assistant Examiner* — Muhammad Awais
(74) *Attorney, Agent, or Firm* — McCarter & English, LLP

(57) ABSTRACT

A method, system and apparatus for anti-sorting particles is disclosed. In an example embodiment, particles move in a fluid along a microfluidic channel. A measurement device determines which particles are selected or desired particles by measuring a desired characteristic of the particles and outputting an associated signal. The energy source continuously imparts a force on unselected or undesired particles in a deflection region of the microfluidic channel to remove the unselected or undesired particles from the stream of particles. Based upon the signal outputted by the measurement device, the energy source is controlled to reduce or eliminate the force on selected particles such that the selected particles flow on a natural or expected flow path to a collection area such as an output channel. By avoiding application of force to desired particles, the anti-sorting systems and methods can improve viability and other characteristics of the desired particles.

23 Claims, 5 Drawing Sheets

Related U.S. Application Data

(60) Provisional application No. 63/175,846, filed on Apr. 16, 2021.

(58) Field of Classification Search
CPC ... G01N 2015/1497; G01N 2015/1028; G01N 2015/1081; G01N 15/149
USPC .......................................................... 209/3.1
See application file for complete search history.

(56) References Cited

U.S. PATENT DOCUMENTS

| | | |
|---|---|---|
| 2005/0173313 A1 | 8/2005 | Tyvoll et al. |
| 2008/0213821 A1 | 9/2008 | Liu et al. |
| 2011/0030808 A1 | 2/2011 | Chiou et al. |
| 2012/0015442 A1 | 1/2012 | Gilbert et al. |
| 2012/0122084 A1 | 5/2012 | Wagner et al. |
| 2012/0160746 A1 | 6/2012 | Thorslund et al. |
| 2013/0334407 A1 | 12/2013 | Perrault, Jr. et al. |
| 2014/0033808 A1 | 2/2014 | Ding et al. |
| 2014/0376816 A1 | 12/2014 | Lagae et al. |
| 2015/0198517 A1 | 7/2015 | Simpson et al. |
| 2015/0268244 A1 | 9/2015 | Cho et al. |
| 2017/0227446 A1* | 8/2017 | Tabata ............... G01N 15/1434 |
| 2018/0031480 A1 | 2/2018 | Sinclair |
| 2018/0246027 A1* | 8/2018 | Vacca ............... G01N 15/1434 |
| 2019/0351408 A1 | 11/2019 | Liu et al. |
| 2020/0070166 A1 | 3/2020 | Skala et al. |
| 2022/0334042 A1 | 10/2022 | Sharpe et al. |

FOREIGN PATENT DOCUMENTS

| | | |
|---|---|---|
| EP | 3418717 A1 | 12/2018 |
| GB | 2584703 A | 12/2020 |
| WO | 2005/075957 A1 | 8/2005 |
| WO | 2007/009983 A1 | 1/2007 |
| WO | 2012/102833 A2 | 8/2012 |
| WO | 2014/142924 A1 | 9/2014 |
| WO | 2020/054735 A1 | 3/2020 |

* cited by examiner

METHOD AND APPARATUS FOR AN ANTI-SORTING FLOW CYTOMETER

CROSS-REFERENCE TO RELATED APPLICATIONS

This patent application in a continuation of U.S. patent application Ser. No. 17/723,236, filed on Apr. 18, 2022 which claims the benefit of priority to U.S. Provisional Application No. 63/175,846, filed Apr. 16, 2021, the entire contents of this application being incorporated herein by reference.

TECHNICAL FIELD

The present disclosure relates generally to devices, systems, and techniques for manipulation of fluids including flow-focusing technology and microfluidics. The present disclosure relates more particularly to microfluidic systems, methods and apparatus used to manipulate particles (such as cells) and fluids.

BACKGROUND

In a conventional microfluidic system, particles can be detected using, e.g., optical means as they flow in a microchannel and, in turn, a force can be applied to particles having desired detected characteristics to separate them from other particles.

SUMMARY

A microfluidic system for anti-sorting particles is provided. The microfluidic system can include a microfluidic channel having an inlet with an aperture to introduce a fluidic stream having a plurality of particles. The microfluidic system can include a measurement device located downstream of the inlet to detect a desired characteristic in one of the plurality of particles and to output a signal associated with the detection. The microfluidic system can include an energy source located in a deflection region located downstream of the measurement device that applies a force to particles in the plurality of particles that are free of the desired characteristic. The energy source is responsive to the signal from the measurement device to reduce or eliminate the application of force to avoid application of the force to one or more of the plurality of particles having the desired characteristic. The microfluidic system can include a first output channel located downstream of the deflection region and configured to output a fluidic stream of particles in the plurality of particles that have the desired characteristic. The microfluidic system can include a second output channel located downstream of the deflection region and configured to receive the particles of the plurality of particles that are free of the desired characteristic.

A method for anti-sorting particles is provided. The method includes flowing a fluidic stream having a plurality of particles from an upstream inlet along a first flow path through a microfluidic channel. The method also includes detecting a desired characteristic in one of the plurality of particles using a measurement device located downstream of the inlet and outputting a signal associated with the detection. The method includes applying a force to particles in the plurality of particles free of the desired characteristic using an energy source in a deflection region located downstream of the measurement device. The force causes the particles free of the desired characteristic to deflect to a waste output channel. The method includes controlling the energy source to reduce or eliminate the application of force in response to the signal associated with detection of the desired characteristic to avoid application of the force to one or more of the plurality of particles having the desired characteristic such that particles having the desired characteristic continue on a natural flow path to a keep output channel.

BRIEF DESCRIPTION OF THE DRAWINGS

The following drawings are designed to illustrate rather than define the limits of the invention.

DETAILED DESCRIPTION

Figure 1:
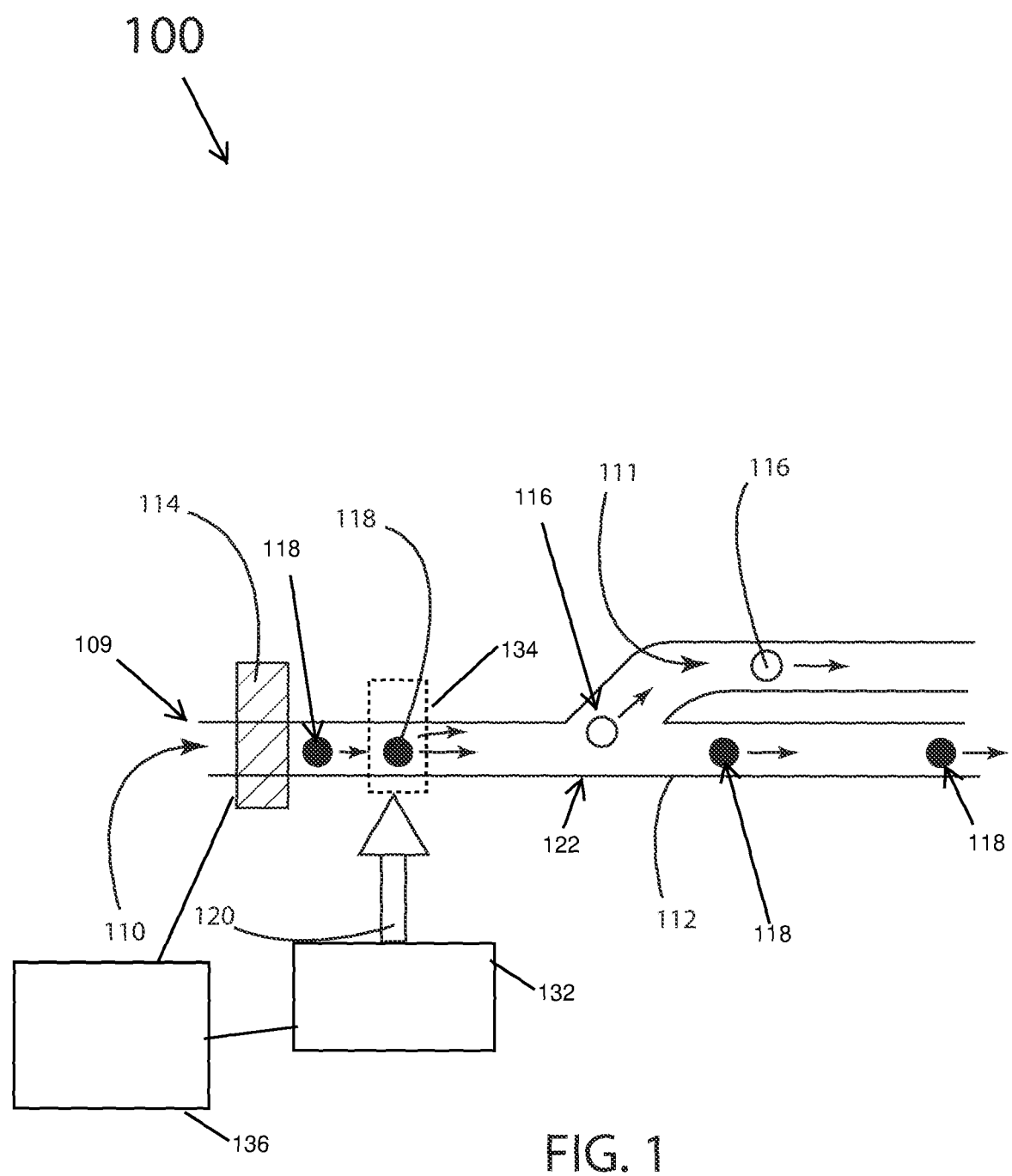
FIG. 1 schematically illustrates an example system in accordance with some embodiments taught herein.

The present disclosure relates to a method and apparatus for anti-sorting selected particles from unselected particles. A force is applied to unselected particles in a fluid stream in a microfluidic channel. The force imparts a change in a flow path for unselected particles to direct the unselected particles to, for example, a waste collection zone. Selected particles are allowed to flow to, for example, a collection location without a change of flow trajectory. By reducing or ceasing the application of the force upon the fluid stream as the selected particles pass a deflection region of the microfluidic channel, the selected particles maintain a flow trajectory and are not acted on by a force-generating deflection mechanism. In some embodiments, the selected particles, which are impacted minimally or not at all by the force, can naturally traverse an undisturbed fluidic path to the point of capture, which can reduce the chance of imparting any effect whatsoever upon the selected particles including by even mild perturbations. For example, certain particles may be sensitive to the force used in a conventional cytometer and can experience changes in viability, functionality, or structure when acted upon by such a force. The systems and methods taught herein can reduce (or, in some cases, eliminate) such impacts on sensitive particles as they will experience little or no force, energy, impulse, or other measureable or non-measureable attribute of the deflection mechanism.

The process of anti-sorting subjects the selected particles to minimal or no deleterious effects because they are spared the application of a force, energy, an impulse or other measurable attribute of a conventional deflection mechanism. Deleterious effects might include effects on viability, functionality, morphology, cellular expression, DNA content, sequence, motility, cell division capability, disassociation of aggregates, or other characteristic. Anti-sorting allows selected particles to traverse and maintain an expected fluid path and flow to a location for capture or further processing.

Systems and methods taught herein address issues related to throughput speed and particle viability in particle-sorting applications. In particle-sorting applications such as in conventional sorting-flow cytometers, particles of interest (i.e., selected particles) are separated from unwanted particles by shifting or changing a flow path of the particle of interest so that an output sample can be created that is mostly or entirely composed of particles of interest. To accomplish this objective, conventional sorters (particularly microfluidic sorters) use mechanical or other means to apply impulses that impart instantaneous forces on particles of interest. The impulse may, for example, deflect the particle of interest from the stream of particles. Because these impulse effects tend to disturb fluid flow within a microfluidic channel to deflect the particle of interest, the sorting mechanism and flow need to be reset so that any next particle of interest can also be deflected and captured. In other words, conventional systems that apply a force to displace a selected particle, such as a force lateral to the motion direction of the particle, require resetting of the force application mechanism. For example, a reset time period can include one or more overlapping or non-overlapping time periods such as time for laminar flow to re-stabilize (e.g., vortices disappear), time for force actuation mechanism to reset (e.g., for a membrane or piezo driver to return to an origin point), or time for processing detection/switching data (e.g., refresh rate on a detector, data I/O rates to a microprocessor, or microprocessor speed). In instances where there are many particles to process in a fixed period of time (i.e., operation at a high throughput speed), particles may be very closely spaced with respect to one another. Because of the reset time, conventional sort strategies can be inadequate to effectively sort certain populations of particles as the sort mechanisms cannot be fully reset before a next particle of interest reaches the sort mechanism at high levels of throughput, resulting in failure to properly sort the next particle of interest. For example, the reset time can be substantially affected by the time needed to reestablish laminar flow in the microchannel after a pressure pulse is applied to deflect or divert particles. Accordingly, conventional systems can be inadequate in reaching an acceptable level of throughput, population purity, enrichment or yield. As a result, conventional systems are not suited for continuously deflecting particles that are not selected, i.e., undesired particles.

Systems and methods taught herein can deflect particles on demand, asynchronously, and can operate without predefined formation of a packet or droplet or timing behavior. Systems and methods taught herein can be applicable to both jet-in-air particle sorters or flow cytometers that use microfluidic channels to flow particles through a detection region (i.e., where a measurement device can observe characteristics of the particles) and a sorting region.

Systems and methods taught herein can produce concentrated populations of desired particles with high viability. Desired particles follow the natural, primary flow path while undesired particles are diverted or deflected to a secondary path. As a result, the desired particles experience little to no perturbation (such as an impact on viability) because they are not subject to the force, energy, impulse, or other measurable or non-measurable attribute of the deflection mechanism. Additionally, the particles naturally traverse the expected fluidic path, which minimizes any chance of even mild perturbation that could affect sensitive particles or cells in a positive or negative way.

In some embodiments, the systems and methods taught herein can reduce dilution effects as most of the desired particles follow the primary flow path while debris, undesired particles, and excess fluid (including sheath fluid in some embodiments) is diverted to secondary or branch channels. As a result, anti-sorting as taught herein can reduce or eliminate the need for further processing steps to concentrate the desired particles. For example, the methodology and systems taught herein are especially advantageous when desired particles make up a high percentage of the total initial number of particles in the sample.

Systems and methods taught herein can change the state of the deflected, unselected particles in some embodiments. For example, the energy provided to deflect the path of the unselected particles can also change the functionality (e.g., of biomolecules in or on the particle) or viability of the particles. The resulting output sample (sometimes characterized as a "waste" sample) can be rendered inert or inactive by having a level of energy imparted to the unselected particles during anti-sorting.

Systems and methods taught herein can divert unselected particles from the fluid stream using a continuously applied force rather than a series of impulses. The continuous application of the force associated with the anti-sorting mechanism can be used in an on-demand fashion to shift or deflect or divert unselected particles from an expected flow path within a fluid in a microfluidic device while leaving selected particles undisturbed as opposed to conventional non-continuous (or impulse) methods. As a result, even a stream of particles with tight interparticle spacing can be continually, separately, or intermittently sorted while reducing interaction with the selected particles.

Microfluidics is an area of technology involving fluid-flow control at a small scale. Microfluidic devices often include very small channels through which fluid flows. The channels may branch or be otherwise arranged to allow fluids to combine, or to divert fluids to different locations; to cause laminar flow between fluids; to dilute fluids, and the like. Examples of techniques being investigated or developed at the microfluidic scale include high-throughput screening, drug delivery, chemical kinetics measurements, therapeutic cell production, cell cloning, genetic sequencing, gender preselection in animals, quantitative spectroscopy, microscopy, imaging, and combinatorial chemistry.

Flow cytometers can be used for analyzing and sorting particles in a fluid sample, such as cells of interest in a biological fluid or chemical sample. A flow cytometer conventionally includes a sample reservoir for receiving and dispensing a fluid sample, and in some embodiments, a sheath reservoir for receiving and dispensing a sheath fluid. Particles having a desirable characteristic are selected, for example, by using optical interrogation to identify the presence, absence, or magnitude of a physical or chemical property of the particle associated with the particle characteristic (the particle characteristic may be measurable without a labelling step) and acted upon so as to separate the selected particles from the remaining population of particles, which are usually discarded. Conventionally, the flow cytometer acts upon the selected particles by imparting some form of energy onto the particle. Anti-sorting systems and methods as taught herein impart energy to non-selected or undesirable particles to separate them from the particle population. In other words, anti-sorting systems and methods as taught herein impart no energy to selected or desirable particles to separate them from the particle population.

As used herein, the term "particles" includes, but is not limited to, cells (e.g., blood platelets, white blood cells, tumorous cells, embryonic cells, stem cells, engineered cells, spermatozoa, etc.), organelles, and multi-cellular organisms. Particles may include liposomes, proteoliposomes, yeast, bacteria, viruses, pollens, algae, or the like. Additionally, particles may include genetic material, RNA, DNA, fragments, proteins, etc. Particles may also refer to non-biological particles. For example, particles may include metals, minerals, polymeric substances, glasses, ceramics, composites, or the like. Particles may also refer to synthetic beads (e.g., polystyrene), for example, beads provided with fluorochrome conjugated antibodies. Particles may include droplets of fluid or reagent having a distinguishable property (e.g., miscibility, refractive index, chemical constituency, or a defined boundary such as a membrane) as compared to adjacent media. Examples of such droplets can include a droplet of oil in water, a droplet of fluid in air, or an air bubble in fluid. Hence, references to particle sorting may include the sorting or manipulation of cells, particles, molecules, droplets, or the like.

As used herein "anti-sorting" refers to sorting of particles by applying a force to undesired particles to separate them from desired particles while releasing, halting or removing the force with respect to selected particles (i.e., desired particles). The term is used in opposition to the conventional concept of "sorting" wherein selected particles (i.e., desired particles) are manipulated by imparting a force to the selected particles to separate them from undesired particles and applying no force to undesired particles.

As used herein, the term "energizing" is used to refer to the application or projection of a force upon a medium. An example medium may be a fluid flow containing particles to be sorted such as a sheath fluid flow, a sample fluid flow, or a combination of sheath and sample fluid. Exemplary forces can include buoyancy, pressure wave, magnetic, electromagnetic, optical/laser, acoustic wave, or dielectrophoresis forces or the like. In the field of microfluidics, particle sorting is conventionally accomplished by energizing the medium around selected particles. Systems and methods taught herein accomplish anti-sorting by energizing the medium around undesired particles and not energizing the medium around selected particles.

A method, system and apparatus for anti-sorting particles is disclosed. In an example embodiment, particles are moved in a fluid along a channel. The particles may be suspended in the fluid. As used herein, "fluid" may include, but is not limited to, sheath fluid, sample fluid, or some combination of both sample and sheath fluid in different proportions and in mixed or separated layers. The fluid may be the same or different from the fluid in which the particles are stored or transported.

In some embodiments, the system continuously energizes the fluid as unselected particles (or no particles) flow through the channel using an energy source that applies a force to the fluid. Particles flow past a measurement device that measures the presence, absence, or magnitude of target characteristics in each particle. If the detected target characteristics of a particle are such that it is desirable to collect the particle, the particle is deemed a selected or desired particle. As the selected particle passes a location of the energy source, the energy source is controlled to reduce or eliminate application of the force to avoid manipulating the selected particle in the same manner that unselected particles are being manipulated. In such embodiments, the selected particles do not have an energy level imparted on them. Conversely, the non-selected particles have an energy level imparted on them and are influenced by the energy to leave the natural flow path of undisturbed particles and, instead, flow into a channel where, for example, they can be directed for disposal. In some embodiments, the selected particles, which do not experience the force that diverts their flow path, can continue on a natural flow path that would be taken by undisturbed particles (i.e., absent an energy source in the system) to a different channel than the non-selected particles. The selected particles are transferred along the path and collected. Thus, all unselected particles are affected by a directing force from the energy source, but application of this directing force is ceased or reduced as selected particles pass the energy source and the desired/selected particles follow a path toward a collection location. In this way, particles are anti-sorted.

FIG. 1 shows a diagram of a microfluidic particle sorting apparatus 100. The microfluidic particle sorting apparatus 100 can include a microfluidic channel 110 that branches at a first branch point 122 to a deviated or second output channel 111. The second output channel 111 may also be referred to as the "waste" output channel. The microfluidic channel 100 extends past the first branch point 122 as a first, undisturbed output channel 112. The first output channel 112 may be referred to as the "keep" output channel. The apparatus 100 also includes a particle measurement device 114 and an energy source 132 that applies a force 120 to particles and fluid in the microfluidic channel 110 at a deflection region 134. In example embodiments, particles in the fluid, absent any perturbations introduced by application of force, naturally flow through microfluidic channel 110 and into the first undisturbed output channel 112, which is downstream of the deflection region 134 and the first branch point 122. Unselected particles 116 can be directed to flow to the second, deviated output channel 111, which is downstream of the deflection region 134, by application of force 120 at the deflection region 134 by the energy source 132. The energy source 132 applies the force 120 to direct unselected particles 116 detected by the particle measurement device 114 to the second output channel 111, but the energy source 132 avoids applying the force 120 to selected particles 118. As a result, the selected particles 118 flow undisturbed to the first microfluidic output channel 112.

The microfluidic channel 110 can have an inlet 109 with an aperture to introduce fluid including particles in a fluidic stream. In some embodiments, the medium in the channel 110 includes a fluid flow containing a mixture of particles including particles that possess a desired characteristic and particles that do not possess the desired characteristic. Particles are measured by the measurement device 114 located downstream of the inlet 109. The measurement device 114 outputs a signal associated with the detection to a computing device 136. The computing device 136 can process the signal to determine whether the measured particle possesses the desired characteristic and thus determine whether the measured particle is a selected or desired particle 118 or whether the measured particle is an undesired particle 116. Selected particles 118 are depicted as filled circles in FIG. 1. Unselected particles 116 (i.e., particles free of the desired characteristic) are depicted as unfilled circles and are directed by the force 120 into the second, deviated output channel 111. The second output channel 111 can thus receive and output a fluidic stream of the undesired particles 116. Conversely, selected particles 118 continue along the microfluidic channel 110 to the output channel 112 because the force 120 is discontinued to avoid applying the force 120 while the selected particle 118 passes through the deflection region 134. The output channel 112 can thus output a fluidic stream of selected particles 118.

In some embodiments, the particle measurement device 114 is based on a laser-detection mechanism. For example, the particle measurement device 114 can include a laser or other light source that illuminates the particles as they flow in the microfluidic channel 110 and a detector to detect light emitted, scattered, or fluoresced from the particle. The detector can also be configured to measure light absorption or extinction due to the particle. The measurement device 114 can measure desired characteristics in as few as a single particle (whether the sample contains one or a plurality of particles).

The desired characteristic of the particle can include nearly any measurable chemical or physical property of the particle. The desired characteristic can be an extrinsic property or exogenous substance associated with the particle (e.g., presence of a label), an intrinsic property of the particle (e.g., size or shape), or a combination of extrinsic and intrinsic properties. In some embodiments, particles can be marked in some fashion such as by fluorescent label or by alternative particle marking or identification techniques understood by those skilled in the art. Such markings, which can then constitute a measurable characteristic of a desired particle, can be visualized using a detection system (e.g., a photomultiplier tube to detect fluorescent signal) or an imaging system (e.g., a charge-coupled device or camera that images particles to discern certain visual features). In some embodiments, the measurement of the desired characteristic can include measuring the presence or absence of the characteristic such as the presence of absence of a fluorescent label. In some embodiments, the measurement of the desired characteristic can include measuring a magnitude of the characteristic such as measuring the intensity of emitted, fluoresced, reflected, absorbed, or extinguished light or measuring the size, shape, diameter, radius, or other physical property of the particle.

In some instances, labeling a particle can have unwanted effects. For example, a labeled particle may have less effectiveness in post-sorting applications due to the physical presence of the label (e.g., steric hindrance between the label and other surface receptors) or biochemical effects induced by the attachment or continued presence of the label. In an example embodiment, the desired characteristic of the particle that is measured by the system can be a presence or absence of a label that is attached to particles. For example, undesired cells can have an attached or exogenous label (such as a contrast agent), and the desired characteristic detected by the system can be an absence of that label. The label can include a chemical or bio-chemical compound that is polymeric, metallic, magnetic, organic, or semiconductor in nature. The label can include a fluorescent molecule, a magnetic particle or bead, or a metallic particle (such as a particle exhibiting surface plasmon resonance or Raman scattering properties). The label can be attached to the particle by hybridizing the label (e.g., attaching a molecule to the label that preferentially binds to a complementary molecule on the particle such as cDNA or the avidin-biotin system) or directly binding the label to the particle (e.g., attaching gold nanoparticle labels to a thiol moiety on the particle). By labeling undesired particles and detecting the absence of the label on desired particles, the desired particles can be minimally affected by any potential adverse biochemical or mechanical interaction between the desired particle and the label. As a result, the expected effectiveness or viability of the desired particle in post-sorting activity is maintained.

In some embodiments, the energy source 132 can continuously apply the force 120 to the medium in the microfluidic channel 110. In such an embodiment, the energy source 132 is momentarily switched off to allow selected or desired particles to continue on the natural or expected flow path (or, in other words, the force 120 is momentarily not applied to the fluid and particles). Continuous application of the force 120 by the energy source 132 has the additional benefit of cleaning the sample by diverting any non-cell debris away from the final collected sample in the keep output channel 112. In some embodiments, the energy source 132 applies a force to the medium (e.g., fluid) in the absence of any particles whatsoever (i.e., the energy source 132 operates in a "continuously-on" state). Applying force to the fluid can preferentially cause fluid flow to the first output channel 112 and can advantageously divert all debris and other unwanted materials from flowing into the keep output channel 112. In other words, the "continuously-on" operation can clean the fluid stream including removal of material that evades detection by the measurement device (such as by being too small or by passing the measurement device too quickly during high throughput operation). In other embodiments, the energy source 132 can be switched to anti-sort particles in an on-demand fashion, i.e., the energy source 132 is momentarily switched on to deflect unselected particles 116 to the second, deviated output channel 111. In such an embodiment, the switch mechanism of the energy source 132 is fast enough to act upon every object (i.e., unselected particle 116) that passes the deflection region 134.

In some embodiments, the measurement device can detect an undesired characteristic in one of the plurality of particles and output a signal associated with the detection. In an example embodiment, the undesired characteristic can be presence of an attached or exogenous label. While the exogenous label can help to distinguish desired particles from undesired particles at the measurement device, the label can also interfere with or disrupt particle processes or properties such as cell viability as described above. By attaching the label to the undesired particles and measuring for the undesired characteristic (i.e., presence of the label), the system can use the energy source 132 to apply force to divert or deflect the undesired particles into the second output channel 111 while eliminating or reducing the application of force to particles free of the undesired characteristic.

The energy source 132 can use one or more technologies to apply the force 120 to the fluid and particles. For example, fluid and particles may have an energy level imparted thereon by way of Surface Acoustic Waves (SAWs), optical tweezers, magnetic activation, buoyancy, dielectrophoresis, thermal forces, and the like. One skilled in the art understands that the term energy level, energizing or energized may refer to any number of methods of applying force or affecting a set of particles while de-energizing refers to halting, releasing or relaxing an applied force or effect.

The energy source 132 can use surface acoustic wave energy in some embodiments to impart the force 120 on fluid and particles. SAWs can be used to drive microfluidic actuation. SAWs can be used to create inertial forces and to change fluid velocities and therefore affect the movement of cells and particles. SAWs can include transverse or longitudinal waves used to deflect unselected particles. SAWs can include standing waves (SSAW), traveling waves (TSAW), or bulk waves. SAWs can also be used in droplet-based microfluidics, wherein droplets are manipulated as an actuation mechanism. An example of a SAW assembly that is appropriate for use as the energy source 132 in conjunction with the systems and methods taught herein is described in U.S. patent application Ser. No. 17/697,462, filed Mar. 17, 2022, and the entire contents of this application is incorporated herein by reference.

In some embodiments, the energy source 132 can include an interdigital transducer (IDT) to provide the SAWs. For example, droplets may be sorted by being pushed toward different outlets. Other processes involve droplet size modulation for splitting, trapping, tweezing or nano-fluidic pipetting.

The energy source 132 can include optical tweezers in some embodiments. Optical tweezers are instruments that use highly focused lasers to hold and move microscopic objects such as atoms, nanoparticles and droplets. The laser can impart an attractive or repulsive force depending upon the relative refractive index between a particle and the medium in which it is situated.

The energy source 132 can use magnetic-activated cell sorting in some embodiments. Magnetic-activated cell sorting (MACS) is a method of separating particles wherein particles are marked with magnetic beads or micro-beads and flow through a magnetic field. Particles paired with microbeads interact with the magnetic field and are subjected to an attractive or repulsive magnetic force while non-paired particles do not interact and are removed.

The energy source 132 can use buoyancy-activated cell sorting in some embodiments. Buoyancy-activated cell sorting (BACS) is a separation technique in which microbubbles bind to particles through antibodies that bind to the surface of the particles. Undesired particles with bound microbubbles are then removed from the sample by a flotation force.

The energy source 132 can use dielectrophoresis in some embodiments. Dielectrophoresis is a process by which a polarizable particle is suspended in a non-uniform electric field. The electric field polarizes the particle, wherein the poles experience a force along the field lines. Field lines may be either attractive or repulsive according to the orientation on the dipole. Since the field is non-uniform, the pole experiencing the greatest electric field dominates over the other and causes the particle to move. The environment is commonly arranged such that a minor movement of the particle is sufficient to separate the particle into a specific flow path intended for selected particles.

As understood by one skilled in the art, the energy source 132 can also utilize a variety of alternative means such as thermally activated deflection, electrical cavitation (e.g., piezo-actuated pressure application) and even optical cavitation. The aforementioned list is merely representative and is not limiting.

In at least some of the above excitation methods, certain sensitive particles can be affected by the mechanism by which they are sorted. Sensitive cells, for example, can be affected by force, energy, impulse or other attributes of the deflection mechanism imparted by the energy source 132. The application of a sorting force in a conventional system therefore threatens to alter sensitive particles in an undesirable way (for example, to reduce or eliminate biochemical functionality or viability of a cell). In an anti-sorting system as taught herein, such potentially negative effects arising due to application of the force 120 are mitigated because selected particles 116 experience a reduction or total absence of the force 120.

In the system 100 illustrated in FIG. 1, two output channels are illustrated. However, one of ordinary skill in the art would understand that additional channels can be provided to enable separation of particles based upon non-binary detected particle characteristics (e.g., where detection of a level of a characteristic, such as fluorescence, rather than presence/absence of the characteristic determines the appropriate output channel) or to enable subdivision of selected or unselected particles based upon a secondary detected characteristic. Different magnitudes of applied force 120 can determine the output channel for a given particle. For example, in such an embodiment, a large magnitude force 120 can be applied to divert unselected particles to the second output channel 111, a small magnitude force 120 can be applied to a subset of selected particles to divert these to a third output channel 117 (shown in FIG. 3), and no force 120 can be applied to allow a different subset of selected particles to flow down the first output channel 112.

In some embodiments, the system 100 can determine a mode of operation from among different modes of operation including anti-sorting operation as taught herein. In some embodiments, the computing device 136 can accept user input to specify the operating mode of the system. Alternatively or in addition, the computing device 136 can determine the best operating mode for a given set of circumstances given input values, target goals, or both input values and target goals provided by a user. Example input values can include tolerances for detection uncertainty or particle position/timing, expected particle density in the sample, and particle flow rate. Target goals can include desired purity, particle viability, or recovery. For example, the computing device 136 can operate in an anti-sorting operation mode based on inputs and target goals including high criticality for particle viability.

In some embodiments, the computing device 136 can determine how to control the energy source 132 based upon input values or target goals received from the user. For example, if high purity is targeted as a goal, the system can minimize the number of undesired particles that are directed, accidentally or intentionally, into the keep channel. For example, the computing device 136 can control the energy source 132 to deflect a selected particle if it is too close in position or time to an unselected particle (thus deflecting both particles but keeping the unselected particle out of the keep channel 112). In another example, the computing device 136 can control the energy source 132 to deflect a particle whose detection is ambiguous, e.g., if the detection of the particle has low confidence or is close to a threshold detection value. In other words, the computing device 136 can include other factors (e.g., proximity of selected particle to neighboring particles, certainty of detection of selected particle) in addition to the measured desired characteristic when deciding whether to control the energy source 132 to reduce or eliminate the force 120 on a particular detected particle.

Figure 3:
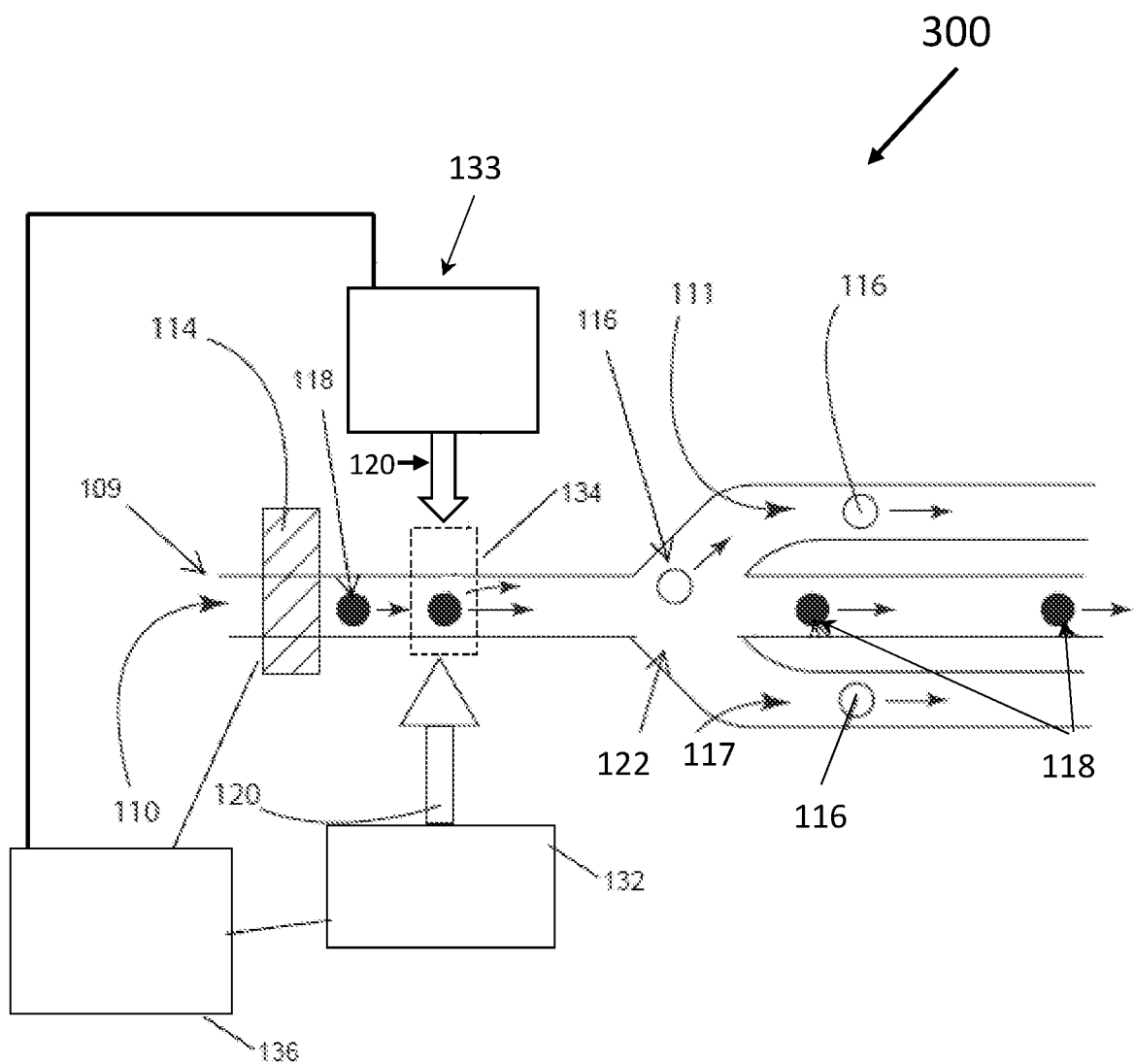
FIG. 3 schematically illustrates an example system in accordance with some embodiments taught herein FIG. 4 schematically illustrates a computing device for use with some embodiments taught herein.

In some embodiments, a second energy source can be provided on the same side of the microchannel but further upstream or downstream from the first energy source 132. The second energy source can provide additional deflection to unselected particles or provide further separation for selected particles, for example, based upon detection of a secondary characteristic FIG. 3 illustrates an example system 300 according to some embodiments taught herein. In some embodiments, the second energy source 133 can be provided on the opposite side of the microchannel at the same location as the first energy source 132, upstream of the first energy source 132, or downstream of the first energy source 132. The location of the second energy source 133 on the opposite side of the channel enables deflection of unselected particles 116 in the opposite direction to the deflection direction provided by the first energy source 132. For example, the two-way output channel design of FIG. 1 can be altered to a three-way channel design as shown in FIG. 3 wherein a third output channel 117 is provided. In some embodiments, the third output channel 117 forms a mirror image of the second output channel 111 symmetrically across a plane defined by the first output channel 112. The first energy source 132 can deflect a portion of the undesired particles 116 down the second output channel 111 while the second energy source 133 on the opposite side can deflect the remaining portion of the undesired particles 116 down the third output channel 117.

Figure 2:
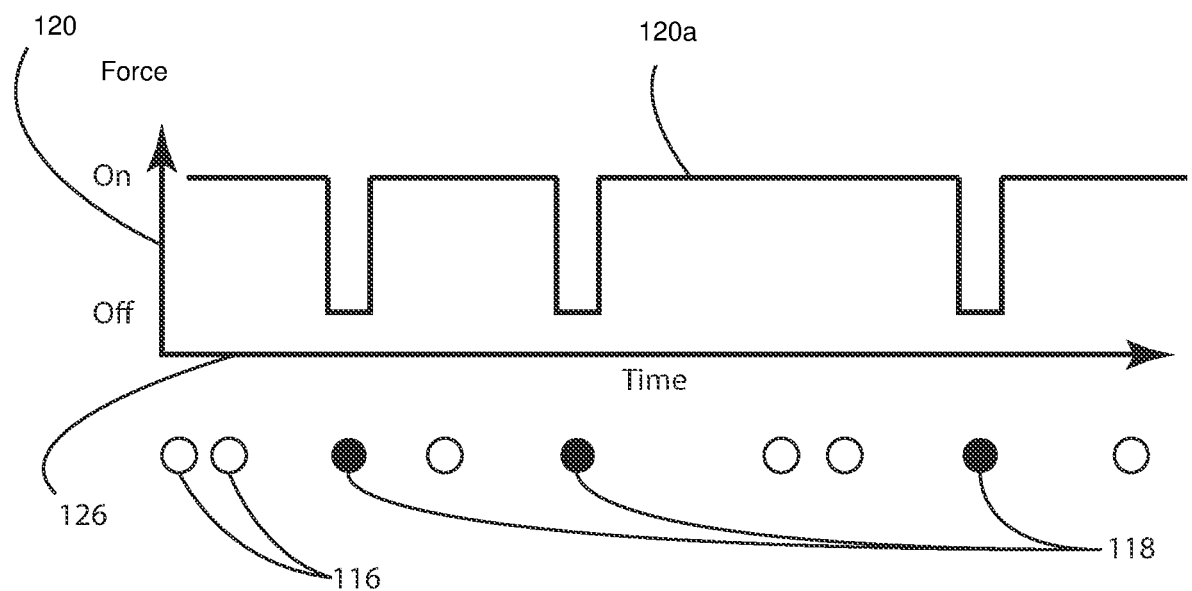
FIG. 2 is a graph depicting the excitation of particles over time in an example embodiment.

FIG. 2 shows a graph that illustrates the application of the force 120 as a function of time 126. As shown on the y-axis, the force can alternate between "on" or "off" states in some embodiments wherein the force being "on" corresponds to a sufficient level of force to deflect a particle into the second output channel 111 and the "off" state corresponding to a level of force that does not perturb the particle from its expected flow path into the first output channel 112. In other words, the "off" state can correspond to zero force or to a small level of force that is insufficient to divert the particle from the expected flow path. An example of the time-varying force 120 that can be applied by the energy source 132 is labeled as the force curve 120a. Below the graph, a sequence of particles is also illustrated as a function of the time 126 at which the particles passed a particular point in space along the microfluidic channel (e.g., the point the particles passed through the deflection region 134). As shown in the graph, the force 120a is applied continuously (i.e., "on" state) while unselected particles 116 are passing through the deflection region 134 and during gaps where no particles are passing through the deflection region 134. The force 120a is reduced or eliminated (i.e., "off" state) for the brief periods of time 126 where selected particles 118 are passing through the deflection region 134 to avoid application of the force 120a to the selected particles 118.

In some embodiments, the systems and methods taught herein can simultaneously anti-sort particles and concentrate the solution of selected particles in a single step. In some embodiments, the force 120 acts continuously on the fluid and particles to divert the stream down the second output channel 111, and only a small portion of the total fluid volume flows down the first output channel 112 including selected particles 116. As a result, the selected particles 116 are relatively more concentrated after an anti-sorting operation than they were in the original sample. This concentration operation occurring simultaneously with anti-sorting reduces the need for subsequent processes to concentrate the selected particles 116.

Figure 4:
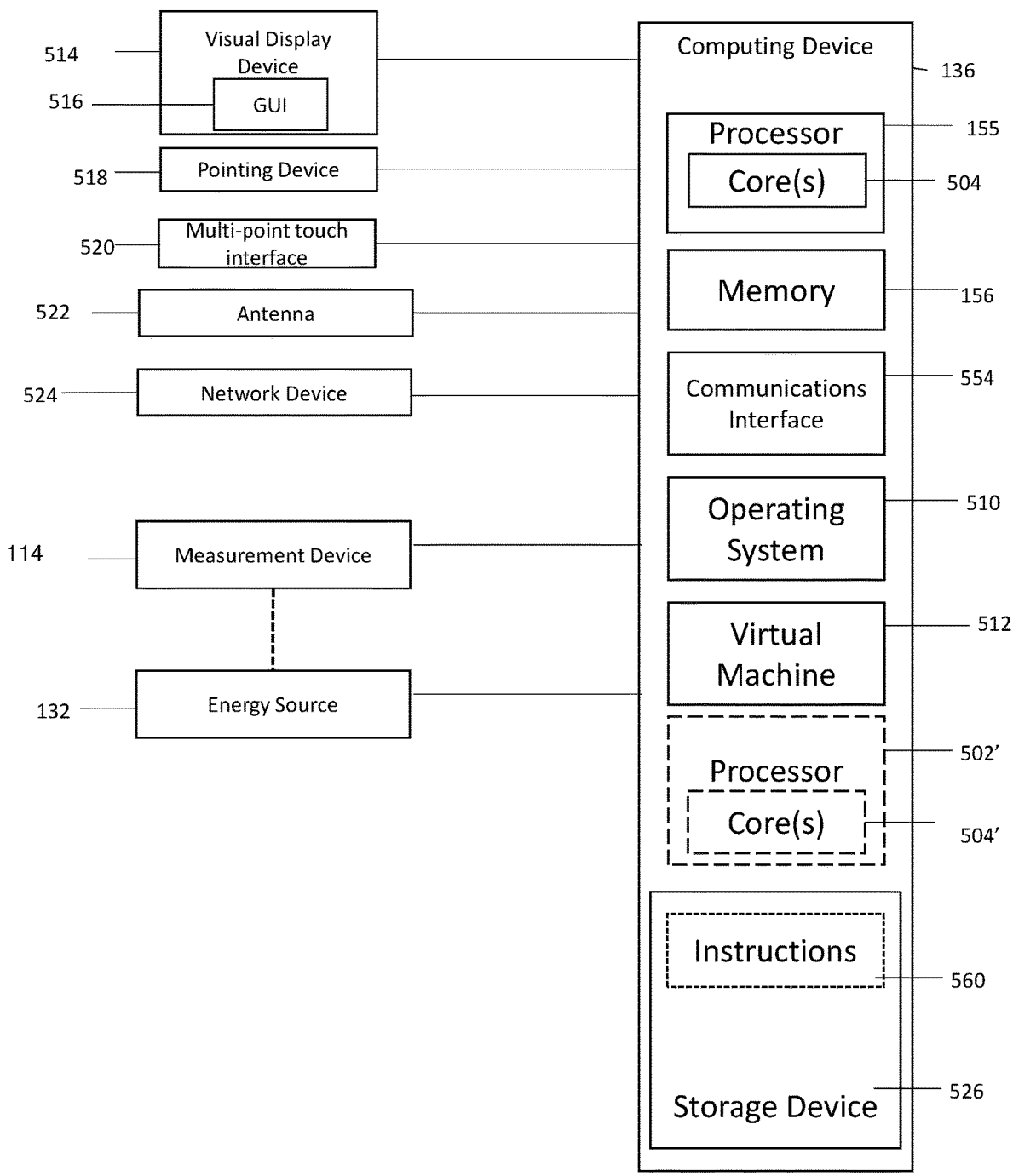

FIG. 4 is a block diagram of a computing device 136 suitable for use with embodiments of the present disclosure. The computing device 136 may be, but is not limited to, a smartphone, laptop, tablet, desktop computer, server, or network appliance. The computing device 136 includes one or more non-transitory computer-readable media for storing one or more computer-executable instructions or software for implementing the various embodiments taught herein. The non-transitory computer-readable media may include, but are not limited to, one or more types of hardware memory (e.g., memory 156), non-transitory tangible media (for example, storage device 526, one or more magnetic storage disks, one or more optical disks, one or more flash drives, one or more solid state disks), and the like. For example, memory 156 included in the computing device 136 may store computer-readable and computer-executable instructions 560 or software (e.g., instructions to anti-sort particles as described above) for implementing operations of the computing device 136. In some embodiments, the memory 156 can store input values or target goals to be achieved by the anti-sorting methodology as taught herein. The computing device 136 also includes configurable and/or programmable processor 155 and associated core(s) 504, and optionally, one or more additional configurable and/or programmable processor(s) 502' and associated core(s) 504' (for example, in the case of computer systems having multiple processors/cores), for executing computer-readable and computer-executable instructions or software stored in the memory 156 and other programs for implementing embodiments of the present disclosure. Processor 155 and processor(s) 502' may each be a single core processor or multiple core (504 and 504') processor. Either or both of processor 155 and processor(s) 502' may be configured to execute one or more of the instructions described in connection with computing device 136.

Virtualization may be employed in the computing device 136 so that infrastructure and resources in the computing device 136 may be shared dynamically. A virtual machine 512 may be provided to handle a process running on multiple processors so that the process appears to be using only one computing resource rather than multiple computing resources. Multiple virtual machines may also be used with one processor.

Memory 156 may include a computer system memory or random access memory, such as DRAM, SRAM, EDO RAM, and the like. Memory 156 may include other types of memory as well, or combinations thereof.

A user may interact with the computing device 136 through a visual display device 514, such as a computer monitor, which may display one or more graphical user interfaces 516. For example, the user can use the GUI 516 or other input device to provide input values or target goals. The user may interact with the computing device 136 using a multi-point touch interface 520 or a pointing device 518.

The computing device 136 may also include one or more computer storage devices 526, such as a hard-drive, CD-ROM, or other computer readable media, for storing data and computer-readable instructions 560 and/or software that implement exemplary embodiments of the present disclosure (e.g., applications or instructions to perform anti-sorting methodologies as taught herein).

The computing device 136 can include a communications interface 554 configured to interface via one or more network devices 524 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 136 can include one or more antennas 522 to facilitate wireless communication (e.g., via the network interface) between the computing device 136 and a network and/or between the computing device 136 and components of the system such as the measurement device 114 or energy source 132. The communications interface 554 may include a built-in network adapter, network interface card, PCMCIA network card, card bus network adapter, wireless network adapter, USB network adapter, modem or any other device suitable for interfacing the computing device 136 to any type of network capable of communication and performing the operations taught herein.

The computing device 136 may run an operating system 510, such as versions of the Microsoft® Windows® operating systems, different releases of the Unix® and Linux® operating systems, versions of the MacOS® for Macintosh computers, embedded operating systems, real-time operating systems, open source operating systems, proprietary operating systems, or other operating system capable of running on the computing device 136 and performing the operations taught herein. In exemplary embodiments, the operating system 510 may be run in native mode or emulated mode. In an exemplary embodiment, the operating system 510 may be run on one or more cloud machine instances.

Figure 5:
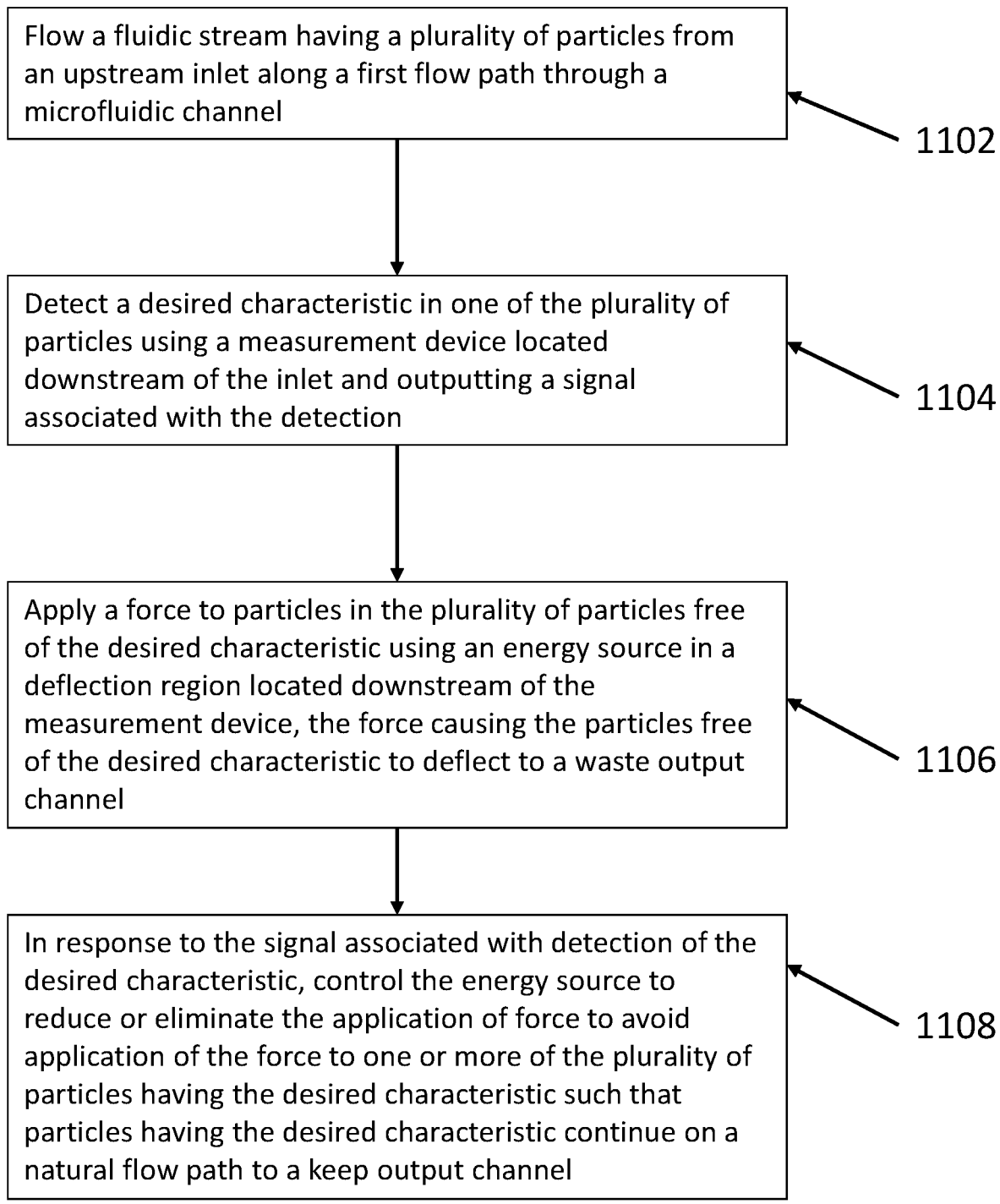
FIG. 5 illustrates a flowchart for a method of anti-sorting particles according to some embodiments taught herein.

FIG. 5 illustrates a flowchart for a method 1100 of anti-sorting particles according to some embodiments taught herein. The method 1100 includes flowing a fluidic stream having a plurality of particles 116, 118 from an upstream inlet 109 along a first flow path through a microfluidic channel 110 (step 1102). The method 1100 also includes detecting a desired characteristic in one of the plurality of particles using a measurement device 114 located downstream of the inlet 109 and outputting a signal associated with the detection (step 1104). The method 1100 includes applying a force 120 to particles 116 in the plurality of particles free of the desired characteristic using an energy source 132 in a deflection region 134 located downstream of the measurement device 114, the force 120 causing the particles 116 free of the desired characteristic to deflect to a waste output channel 111 (step 1106). The method 1100 includes controlling the energy source 132 in response to the signal associated with detection of the desired characteristic to reduce or eliminate the application of force 120 to avoid application of the force 120 to one or more of the plurality of particles having the desired characteristic such that particles 118 having the desired characteristic continue on a natural flow path to a keep output channel 112 (step 1108).

The anti-sorting concepts, methods, and systems taught herein can include or be combined with other upstream and downstream elements associated with the microfluidic channel such as hydrodynamic or acoustic focusing, alignment, orientation (particularly for the case of anti-sorting sperm cells), and concentration elements as but several non-limiting examples.

Unless defined otherwise, all technical and scientific terms used herein have the same meaning as commonly understood by one of ordinary skill in the art to which this disclosure belongs. It is also to be understood that the terminology used herein is for the purpose of describing particular embodiments only, and is not intended to be limiting, since the scope of the present disclosure will be limited only by the appended claims. Although any methods and materials similar or equivalent to those taught herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The invention claimed is:

1. A microfluidic system for anti-sorting particles, the microfluidic system comprising:
    a microfluidic channel having an inlet with an aperture to introduce a fluidic stream having a plurality of particles;
    a measurement device located downstream of the inlet to detect a desired characteristic in one of the plurality of particles and to output a signal associated with the detection;
    an energy source located in a deflection region located downstream of the measurement device that applies a force to particles in the plurality of particles that are free of the desired characteristic, the energy source being responsive to the signal from the measurement device to reduce the application of force to minimize application of the force to one or more of the plurality of particles having the desired characteristic;
    a first output channel located downstream of the deflection region and configured to output a fluidic stream of particles in the plurality of particles that have the desired characteristic; and
    a second output channel located downstream of the deflection region and configured to receive the particles of the plurality of particles that are free of the desired characteristic.

2. The microfluidic system of claim 1, wherein the energy source reduces the application of force to a level of force that is greater than zero, but is insufficient to divert one or more particles in the plurality of particles that have the desired characteristic.

3. The microfluidic system of claim 1, wherein the energy source continuously applies a level of force.

4. The microfluidic system of claim 3, wherein the level of force varies.

5. The microfluidic system of claim 1, wherein the energy source includes an interdigital transducer configured to produce a surface acoustic wave.

6. The microfluidic system of claim 1, wherein the energy source operates in a continuously-on state to continuously apply the force to the fluidic stream and particles in the plurality of particles, the continuously-on state being variable to enable passage of particles having the desired characteristic through the deflection region without application of sufficient force to the particles having the desired characteristic to cause such particles to deflect.

7. The microfluidic system of claim 6, wherein the energy source operates in the continuously-on state to continuously apply the force to the microfluidic channel in an absence of any particles.

8. The microfluidic system of claim 1, wherein the particles free of the desired characteristic have an attached label and the particles having the desired characteristic are free of the attached label.

9. The microfluidic system of claim 1, further comprising a computing device configured to control the energy source based on the signal from the measurement device and based upon input values or target goals received from a user.

10. The microfluidic system of claim 9, wherein the computing device is further configured to switch between operating modes based upon the input values or the target goals.

11. The microfluidic system of claim 1, wherein the energy source is a first energy source, the system further comprising a second energy source upstream or downstream of the first energy source.

12. A method for anti-sorting particles, the method comprising:
    flowing a fluidic stream having a plurality of particles from an upstream inlet along a first flow path through a microfluidic channel;
    detecting a desired characteristic in one of the plurality of particles using a measurement device located downstream of the inlet and outputting a signal associated with the detection;
    applying a force to particles in the plurality of particles free of the desired characteristic using an energy source in a deflection region located downstream of the measurement device, the force causing the particles free of the desired characteristic to deflect to a waste output channel;

in response to the signal associated with detection of the desired characteristic, controlling the energy source to reduce the application of force to minimize application of the force to one or more of the plurality of particles having the desired characteristic such that particles having the desired characteristic continue on a natural flow path to a keep output channel.

13. The method of claim 12, wherein controlling the energy source to reduce the application of force comprises controlling the energy source to reduce the application of force to a level of force that is greater than zero, but is insufficient to divert one or more particles in the plurality of particles that have the desired characteristic.

14. The method of claim 12, further comprising controlling the energy source to continuously apply a level of force.

15. The method of claim 14, further comprising varying the level force.

16. The method of claim 12, wherein the energy source includes an interdigital transducer, the step of applying force further comprising controlling the interdigital transducer to produce a surface acoustic wave.

17. The method of claim 12, further comprising operating the energy source in a continuously-on state to continuously apply the force to the fluidic stream and particles in the plurality of particles, wherein the step of controlling the energy source to reduce the application of force includes varying the continuously-on state to enable passage of particles having the desired characteristic through the deflection region without application of sufficient force to the particles having the desired characteristic to cause such particles to deflect.

18. The method of claim 17, further comprising operating the energy source in the continuously-on state to continuously apply the force to the microfluidic channel in an absence of any particles.

19. The method of claim 12, further comprising associating an exogenous label with particles in the plurality of particles to create the particles free of the desired characteristic.

20. The method of claim 12, wherein applying the force further comprises using a computing device to control the energy source based on the signal from the measurement device and input values, target goals, or both input values and target goals received from a user.

21. The method of claim 20, further comprising switching between operating modes based upon the input values, the target goals, or both.

22. The method of claim 12, wherein the energy source is a first energy source, the method further comprising applying a force to particles in the plurality of particles using a second energy source upstream or downstream of the first energy source.

23. The method of claim 12, further comprising concentrating the one or more of the plurality of particles having the desired characteristic in the keep output channel.

* * * * *